United States Patent
Miyazawa

(10) Patent No.: US 9,464,201 B2
(45) Date of Patent: Oct. 11, 2016

(54) NON-AQUEOUS INK JET INK COMPOSITION, INK STORAGE BODY, INK JET RECORDING METHOD, AND INK JET RECORDING DEVICE

(71) Applicant: Seiko Epson Corporation, Tokyo (JP)

(72) Inventor: Yoshio Miyazawa, Shiojiri (JP)

(73) Assignee: Seiko Epson Corporation (JP)

( * ) Notice: Subject to any disclaimer, the term of this patent is extended or adjusted under 35 U.S.C. 154(b) by 11 days.

(21) Appl. No.: 14/669,416

(22) Filed: Mar. 26, 2015

(65) Prior Publication Data
US 2015/0275002 A1 Oct. 1, 2015

(30) Foreign Application Priority Data

Mar. 27, 2014 (JP) .................................. 2014-066934
Mar. 19, 2015 (JP) .................................. 2015-056168

(51) Int. Cl.
*C09D 11/322* (2014.01)
*C09D 11/36* (2014.01)
*C09D 11/107* (2014.01)

(52) U.S. Cl.
CPC ........... *C09D 11/322* (2013.01); *C09D 11/107* (2013.01); *C09D 11/36* (2013.01)

(58) Field of Classification Search
None
See application file for complete search history.

(56) References Cited

U.S. PATENT DOCUMENTS

| | | | |
|---|---|---|---|
| 6,585,362 B2* | 7/2003 | Blease | B01F 17/00 106/31.65 |
| 2003/0200897 A1 | 10/2003 | Nakatsu et al. | |
| 2009/0220695 A1 | 9/2009 | Oyanagi et al. | |
| 2013/0141505 A1* | 6/2013 | Ikeda | C09D 11/101 347/104 |
| 2013/0286120 A1 | 10/2013 | Kobayashi et al. | |
| 2014/0218451 A1* | 8/2014 | Iseki | C09D 11/328 347/100 |

FOREIGN PATENT DOCUMENTS

| | | |
|---|---|---|
| EP | 2157163 A1 | 2/2010 |
| EP | 2540783 A1 | 1/2013 |
| GB | 2458198 A | 9/2009 |
| JP | 2003-313472 A | 11/2003 |
| JP | 2013-076037 A | 4/2013 |

OTHER PUBLICATIONS

Extended European Search Report for Application No. EP 15 16 1002 dated Jul. 2, 2015 (8 pages).

* cited by examiner

*Primary Examiner* — An Do
*Assistant Examiner* — Renee I Wilson
(74) *Attorney, Agent, or Firm* — Harness, Dickey & Pierce, P.L.C.

(57) ABSTRACT

A non-aqueous ink jet ink composition according to an embodiment is stored in an ink storage body, in which a solvent contained in an ink composition is configured with an organic solvent, and a dissolved oxygen concentration in the ink composition is in a range of 30% to 80% of a saturated dissolved oxygen concentration in room temperature.

20 Claims, 4 Drawing Sheets

NON-AQUEOUS INK JET INK COMPOSITION, INK STORAGE BODY, INK JET RECORDING METHOD, AND INK JET RECORDING DEVICE

BACKGROUND

1. Technical Field

The present invention relates to a non-aqueous ink jet ink composition, an ink storage body, an ink jet recording method, and an ink jet recording device.

2. Related Art

In the related art, various methods are used as recording methods for forming an image based on an image data signal on a recording medium such as paper. Among these, since an ink jet recording method causes an image to be formed directly on a recording medium by ejecting ink only to a required image portion by a cheap device, the ink may be effectively used. Therefore, the running cost is cheap. Further, since the ink jet recording method causes little noise, the ink jet method is excellent as a recording method.

As the ink used in such an ink jet recording method, aqueous ink using water as a main solvent and a solvent ink (non-aqueous ink) using an organic solvent as a main solvent are generally used. The solvent ink is a kind of pigment ink, and the component of the ink is dispersed in an organic solvent, not in water so as to present high water repellent properties and great light stability. Since the solvent ink may permeate a vinyl chloride film or the like to be fixed, it can be used outdoors for a long time. The solvent ink is largely divided into two kinds of ink: a real solvent (high solvent) ink and an eco-solvent (low solvent) ink. The eco-solvent ink is solvent ink in which coloring materials are dispersed in an organic solvent which has low odor and concerns the human body and the environment. An organic solvent that is not corresponds to the organic solvent regulated by the Industrial Safety and Health Law, that is not correspond to the first and second kinds of organic solvents regulated by the Ordinance on the Prevention of Organic Solvent Poisoning, or that is not a requirement of a local exhaust device in an indoor workshop having an installation environment regulated by the Fire Service Act is used.

In the related art, with respect to aqueous ink, when the ink cartridge is manufactured, the dissolved oxygen concentration of the ink introduced to the cartridge has to be sufficiently decreased (for example, see JP-A-2003-313472). This is because if the dissolved oxygen concentration of the ink is high, bubbles are generated in the ink in the printer to cause ejection defect. The bubbles are generated by oxygen dissolved in the ink. Therefore, it is considered that the solvent ink requires sufficient degassing in the same manner as the aqueous ink, so a degassing step has been actually performed on the solvent ink so as to sufficiently decrease the dissolved oxygen concentration (for example, see JP-A-2013-76037). However, since the solvent ink has high saturated dissolved oxygen concentration, the degassing step requires a long time.

SUMMARY

An advantage of some aspects of the invention is to provide a non-aqueous ink jet ink composition, an ink storage body, an ink jet recording method and an ink jet recording device which can reduce the load to the degassing step while the ejection stability is maintained.

The inventors of the invention found that the ejection stability was secured even if the non-aqueous ink was caused to have the dissolved oxygen concentration slightly higher than the aqueous ink, so that the degassing step was reduced to cause the cost reduction. This is because the organic solvent had the saturated dissolved oxygen concentration higher than water, more oxygen was able be dissolved in the organic solvent, and the dissolved oxygen was hard to become bubbles. Further, it has been known that the amount of oxygen that was dissolved in water (saturated oxygen amount) decreases as the temperature of water was higher. In the aqueous ink, the ejection defect increased as the temperature of the ink was higher, but in the solvent ink, the ejection defect decreased as the temperature of the ink was higher, and thus it was found out that the solvent ink had a tendency contrary to water.

That is, the invention is as follows.

[1] According to an aspect of the invention, there is provided a non-aqueous ink jet ink composition stored in an ink storage body, in which a solvent contained in an ink composition is configured with an organic solvent, and a dissolved oxygen concentration in the ink composition is in a range of 30% to 80% of a saturated dissolved oxygen concentration in room temperature.

[2] In the non-aqueous ink jet ink composition according to [1], the dissolved oxygen concentration of the non-aqueous ink jet ink composition may be in a range of 40% to 55% of the saturated dissolved oxygen concentration in room temperature.

[3] The non-aqueous ink jet ink composition according to [1] or [2] may contain alkylene glycol alkyl ethers or cyclic esters as the organic solvent.

[4] The non-aqueous ink jet ink composition according to [3] may contain alkylene glycol alkyl ethers as a main solvent of the organic solvent.

[5] In the non-aqueous ink jet ink composition according to any one of [1] to [4], the non-aqueous ink jet ink composition may not contain a polymerizable compound.

[6] In the non-aqueous ink jet ink composition according to any one of [1] to [5], a viscosity of the non-aqueous ink jet ink composition may be 5 mPa·s or less at 20° C.

[7] In the non-aqueous ink jet ink composition according to any one of [1] to [6], a temperature of the non-aqueous ink jet ink composition when being ejected from an ink jet head may be 35° C. or greater.

[8] In the non-aqueous ink jet ink composition according to any one of [1] to [7], an ejection frequency when the non-aqueous ink jet ink composition was ejected from an ink jet head may be in a range of 1 kHz to 200 kHz.

[9] According to another aspect of the invention, there is provided an ink storage body that stores the non-aqueous ink jet ink composition according to any one of [1] to [8].

[10] According to still another aspect of the invention, there is provided an ink jet recording method for performing recording by using the non-aqueous ink jet ink composition according to any one of [1] to [9].

[11] According to still further another aspect of the invention, there is provided an ink jet recording device that performs the ink jet recording method according to [10].

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
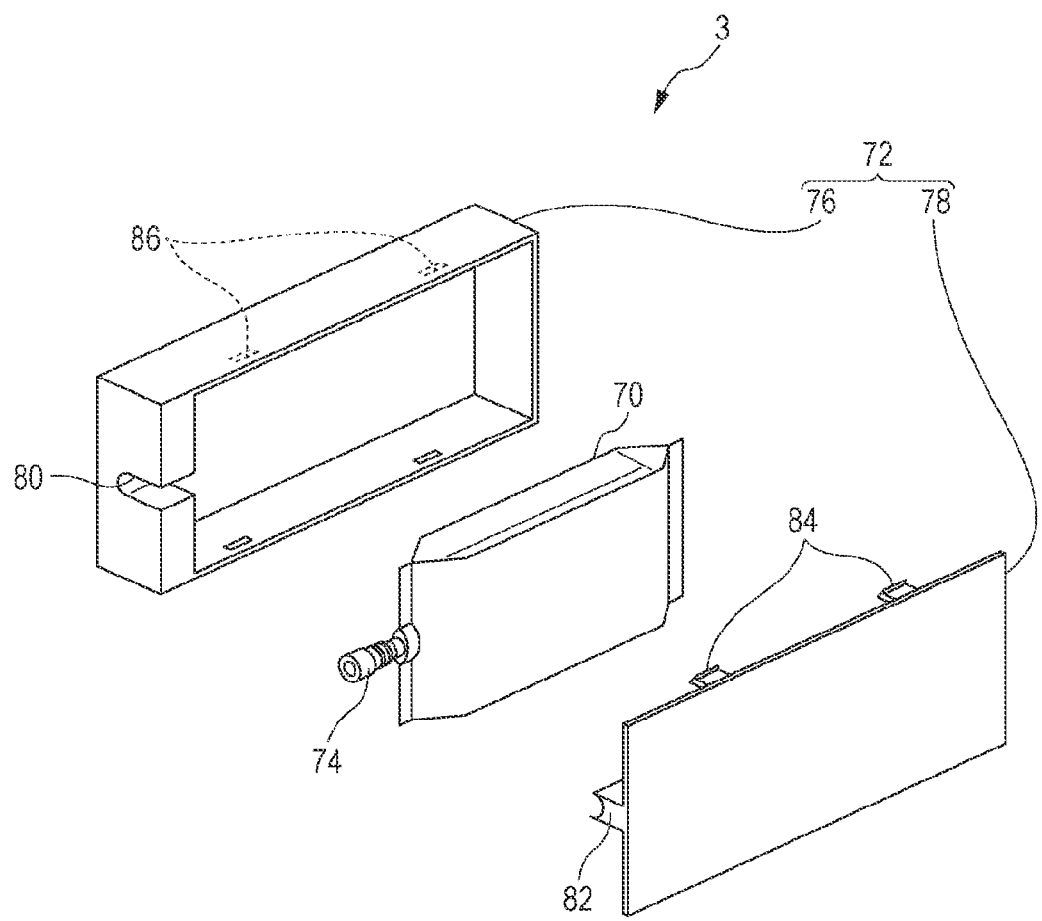
FIG. 1 is an exploded perspective view illustrating an example of a non-aqueous photocuring ink jet ink composition storage body according to an embodiment.

Hereinafter, embodiments of the invention are described in detail.

Ink Composition

The ink composition according to an embodiment of the invention is a non-aqueous ink composition of which the solvent contained in the ink composition is configured with an organic solvent. The "non-aqueous ink composition" is an ink composition of which the main solvent component (volatile component) of the ink composition is a component other than water, and the main solvent component is a solvent such as an organic solvent. In addition, the main solvent component in the ink preparation is preferably an ink composition to which water is not intentionally added, and includes the case where moisture is inevitably contained as an impurity. The content in the composition is 5% by mass or less, preferably 1% by mass or less, more preferably 0.1% by mass or less, or may be 0% by mass. In addition, the ink composition according to the embodiment of the invention is a non-aqueous ink jet ink composition. The ink jet ink composition (hereinafter, also simply referred to as the ink composition) is an ink composition which is used by being ejected from an ink jet head by an ink jet method.

The ink composition according to the embodiment is preferably so-called eco-solvent ink. As described above, the eco-solvent ink is a solvent ink in which the coloring materials are dispersed in an organic solvent which has low odor and considers the human body or the environment. A solvent that is not corresponds to the organic solvent regulated by the Industrial Safety and Health Law, that is not correspond to the first and second kinds of organic solvents regulated by the Ordinance on the Prevention of Organic Solvent Poisoning, or that is not a requirement of a local exhaust device in an indoor workshop having an installation environment regulated by the Fire Service Act.

Hereinafter, the component contained in the ink composition according to the embodiment is described in detail.

Pigment

The non-aqueous ink composition according to the embodiment contains a pigment. As the non-aqueous ink composition, pigments such as an inorganic pigment and an organic pigment generally used in the non-aqueous ink composition according to the related art may be used. The pigment may be used singly, or two or more types thereof may be used in combination.

Examples of the organic pigments include an azo pigment (for example, azo lake, an insoluble azo pigment, a condensed azo pigment, and a chelate azo pigment), a polycyclic pigment (a phthalocyanine pigment, perylene, a perylene pigment, an anthraquinone pigment, a quinacridone pigment, a dioxazine pigment, a thioindigo pigment, an isoindolinone pigment, and a quinophthalone pigment, and the like), dye lake (for example, basic dye lake, and acid dye lake), a nitro pigment, a nitroso pigment, aniline black, and a neutral-white fluorescent pigment. In addition, examples of inorganic pigments include carbon black, titanium dioxide, silica, and alumina.

Examples of magenta or red-based organic pigments include C.I.pigment red 2, C.I.pigment red 3, C.I.pigment red 5, C.I.pigment red 6, C.I.pigment red 7, C.I.pigment red 15, C.I.pigment red 16, C.I.pigment red 48:1, C.I.pigment red 53:1, C.I.pigment red 57:1, C.I.pigment red 122, C.I.pigment red 123, C.I.pigment red 139, C.I.pigment red 144, C.I.pigment red 149, C.I.pigment red 166, C.I.pigment red 170, C.I.pigment red 177, C.I.pigment red 178, C.I.pigment red 194, C.I.pigment red 209, C.I.pigment red 222, and C.I.pigment red 224.

Examples of orange or yellow-based organic pigments include C.I.pigment orange 31, C.I.pigment orange 43, C.I.pigment orange 64, C.I.pigment yellow 12, C.I.pigment yellow 13, C.I.pigment yellow 14, C.I.pigment yellow 15, C.I.pigment yellow 17, C.I.pigment yellow 74, C.I.pigment yellow 93, C.I.pigment yellow 94, C.I.pigment yellow 128, C.I.pigment yellow 138, C.I.pigment yellow 150, and C.I.pigment yellow 180.

Examples of green or cyan-based organic pigments include C.I.pigment blue 15, C.I.pigment blue 15:2, C.I.pigment blue 15:3, C.I.pigment blue 16, C.I.pigment blue 60, C.I.pigment green 7, and C.I.pigment green 36.

Examples of black-based inorganic pigments include carbon black.

The pigment contained in the non-aqueous ink composition according to the embodiment is preferably an organic pigment. The dispersibility of the organic pigment in the non-aqueous ink composition is better than the dispersibility of the inorganic pigment. Thereafter, the organic pigment can be evenly dispersed in a container in which the non-aqueous ink composition is filled, compared with the inorganic pigment.

The content of the pigment is 0.5% by mass to 25% by mass with respect to the total amount of the non-aqueous ink composition, and preferably 0.5% by mass to 15% by mass, and more preferably 1% by mass to 10% by mass.

The average particle diameter (d50) of the pigment is preferably in the range of 10 nm to 500 nm, more preferably in the range of 50 nm to 400 nm, and particularly preferably in the range of 100 nm to 300 nm. If the average particle diameter (d50) of the pigment is within the range above, the dispersibility of the pigment in the non-aqueous ink composition becomes better.

The "average particle diameter (d50)" according to the invention refers to a particle diameter when the particle size distribution based on the number of items is measured by a particle size distribution measurement device of which a laser diffraction scattering method is used as the measurement principle and the accumulation existence probability of the particles is 50%. For example, as a laser diffraction particle size distribution measurement device, Microtrac may be used (manufactured by Microtrac, Type "UPA-150").

Organic Solvent

The non-aqueous ink composition according to the embodiment contains an organic solvent. The organic solvent used in the non-aqueous ink composition is a solvent ink in which the coloring materials are dispersed in an organic solvent which has low odor and considers the human body or the environment. A solvent that is not corresponds to the organic solvent regulated by the Industrial Safety and Health Law, that is not correspond to the first and second kinds of organic solvents regulated by the Ordinance on the Prevention of Organic Solvent Poisoning, or that is not a requirement of a local exhaust device in an indoor workshop having an installation environment regulated by the Fire Service Act.

Examples of the organic solvents include alkylene glycol alkyl ethers and cyclic esters which are liquid under the ordinary temperature and normal pressure.

Examples of alkylene glycol alkyl ethers include alkylene glycol monoalkyl ether and alkylene glycol dialkyl ether.

Examples of alkylene glycol monoalkyl ether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol dialkyl ether include ethylene glycol dimethyl ether, ethylene glycol diethyl ether, ethylene glycol dibutyl ether, diethylene glycol dimethyl ether, diethylene glycol diethyl ether, diethylene glycol ethylmethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

The non-aqueous ink composition according to the embodiment preferably contains alkylene glycol alkyl ethers as the main solvent. The "main solvent" is a solvent that occupies the most content in the solvent contained in the ink composition. The lower limit of the content of alkylene glycol alkyl ethers is preferably 20% or greater, 40% or greater, and 50% or greater with respect to the total amount of the non-aqueous ink composition, and the higher limit thereof is preferably 95% or less, 90% or less, and 80% or less with respect to the total amount of the non-aqueous ink composition. The non-aqueous ink composition containing alkylene glycol alkyl ethers as the main solvent tends to be excellent in glossiness, and ejection stability, compared with the non-aqueous ink composition containing the other organic solvent as the main solvent.

The cyclic esters is a compound having a cyclic structure by an ester bond, and γ-lactone having a 5-membered ring structure, δ-lactone having a 6-membered ring structure, and ε-lactone having a 7-membered ring structure. Examples thereof include γ-butyrolactone, γ-valerolactone, γ-hexalactone, γ-heptalactone, γ-octalactone, γ-nonalactone, γ-decalactone, δ-undecalactone, δ-valerolactone, δ-hexalactone, δ-heptalactone, δ-octalactone, δ-nonalactone, δ-decalactone, δ-undecalactone, and ε-caprolactam.

A preferred form of the lactone-based solvent according to the invention is γ-lactone having a 5-membered ring structure, and the more preferred form is γ-butyrolactone or γ-valerolactone.

The lower limit of the content of cyclic esters is preferably 3% by mass or greater, and more preferably 5% by mass or greater with respect to the total amount of the non-aqueous ink composition, and the higher limit thereof is preferably 30% by mass or less, and more preferably 20% by mass or less with respect to the total amount of the non-aqueous ink composition. Accordingly, the non-aqueous ink composition can have the permeability to a polyvinyl chloride base material, leveling properties, and drying properties in printing.

Examples of the organic solvents include a hydrocarbon-based solvent, an alcohol-based solvent, and an ester-based solvent.

Examples of the hydrocarbon-based solvents include aliphatic hydrocarbon (for example, paraffin and isoparaffin), alicyclic hydrocarbon (for example, cyclohexane, cyclooctane, and cyclodecane), and aromatic hydrocarbon (for example, benzene, toluene, xylene, naphthalene, and tetralin). As the hydrocarbon-based solvent, a commercially available product may be used, and the aliphatic hydrocarbon-based solvent or the alicyclic hydrocarbon-based solvent such as IP solvent 1016, IP solvent 1620, and IP clean LX (the above are product names manufactured by Idemitsu Kosan Co., Ltd.), Isopar G, Isopar L, Isopar H, Isopar M, Exxsol D40, Exxsol D80, Exxsol D100, Exxsol D130, and Exxsol D140 (the above are product names manufactured by Exxon Mobil Corporation), NS clean 100, NS clean 110, NS clean 200, and NS clean 220 (the above are product names manufactured by JX Nippon Oil & Energy Corporation), and Naphtesol 160, Naphtesol 200, and Naphtesol 220 (the above are product names manufactured by JX Nippon Oil & Energy Corporation), and the aromatic hydrocarbon-based solvent such as Solvesso 200 (product name manufactured by Exxon Mobil Corporation) are included.

Examples of the alcohol-based solvents include methanol, ethanol, isopropanol, 1-propanol, 1-butanol, 2-butanol, 3-pentanol, 2-methyl-1-butanol, 2-methyl-2-butanol, isoamyl alcohol, 3-methyl-2-butanol, 3-methoxy-3-methyl-1-butanol, 4-methyl-2-pentanol, allyl alcohol, 1-hexanol, 1-heptanol, 2-heptanol, and 3-heptanol.

Examples of the ester-based solvents include methyl acetate, ethyl acetate, n-propyl acetate, isopropyl acetate, n-butyl acetate, isobutyl acetate, isopentyl acetate, sec-butyl acetate, amyl acetate, methoxybutyl acetate, methyl lactate, ethyl lactate, butyl lactate, methyl caprylate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, and diethylene glycol monobutyl ether acetate.

The total content of at least one of the hydrocarbon-based solvent, the alcohol-based solvent, and the ester-based solvent as the organic solvent is preferably 40% by mass or greater, more preferably 50% by mass or greater, still more preferably 60% by mass or greater, particularly preferably 70% by mass or greater, and more particularly preferably 80% by mass, with respect to the total amount of the non-aqueous ink composition. The higher limit thereof is not limited, but 99.5% by mass or less.

The total content of the organic solvent is preferably 80% by mass or greater, and more preferably 90% by mass or greater with respect to the total amount of the non-aqueous ink composition. The higher limit thereof is not particularly limited, but preferably 99.5% by mass or less with respect to the total amount of the non-aqueous ink composition.

Binder Resin

In addition, in addition to the other component described above, the non-aqueous ink composition according to the embodiment may add the binder resin for the purpose of adjusting the viscosity of the ink. Examples of the binder resin include a fiber-based resin such as an acryl resin, a styrene acryl resin, a rosin-modified resin, a phenol resin, a terpene-based resin, a polyester resin, a polyamino resin, an epoxy resin, a vinyl chloride-vinyl acetate copolymer resin, and cellulose acetate butyrate, and a vinyltoluene-a-methylstyrene copolymer resin. The binder resin may be used singly, or two or more types thereof may be used in combination. In addition, the binder resin can improve the fixability of the ink on the recording medium depending on the addition amount thereof.

The Other Components

In order to improve the performance of the non-aqueous ink composition, the non-aqueous ink composition according to the embodiment may contain components contained in the general non-aqueous ink composition, in addition to the pigments and the organic solvents. Examples of the components include a surfactant, a dispersant, a preservative or a fungicide, an antioxidant, and a pH adjusting agent.

The surfactant can be used in the viewpoint of enhancing the wettability of the non-aqueous ink composition to the ink channel and enhancing the washability of the ink channel. The surfactant is not particularly limited, but examples thereof include a polyoxyethylene derivative such as a silicon-based surfactant, a fluorine-based surfactant, or a nonionic surfactant.

The silicon-based surfactant is preferably polyester-modified silicon or polyether-modified silicon. Specific examples thereof include BYK-347, 348, BYK-UV3500, 3510, 3530, and 3570 (all are manufactured by BYK Japan KK).

As the fluorine-based surfactant, a fluorine-modified polymer is preferably used, and specific examples include BYK-340 (manufactured by BYK Japan KK).

In addition, as polyoxyethylene derivatives, an acetylene glycol-based surfactant is preferably used. Specific examples include Surfynol 82, 104, 465, 485, and TG (all are manufactured by Air Products Japan Inc.), Olfine STG and E1010 (all are manufactured by Nissin Chemical Co., Ltd.), Nissan Nonion A-10R and A-13R (all are manufactured by NOF Corporation), Flowlen TG-740W and D-90 (manufactured by Kyoeisha Chemical Co., Ltd.), and Noigen CX-100 (manufactured by Dai-ichi Kogyo Seiyaku Co., Ltd.).

The dispersant may be used in the viewpoint of enhancing the dispersion stability of the pigment. As the dispersant, an arbitrary dispersant using a general non-aqueous ink composition can be used. As the dispersant, a dispersant that effectively works when the solubility parameter of the organic solvent is 8 to 11 is preferably used. Specific examples of the dispersant include polyester-based polymer compounds such as Hinoact KF1-M, T-6000, T-7000, T-8000, T-8350P, and T-8000E (all are manufactured by Takefu Fine Chemicals Co., Ltd.), Solsperse 20000, 24000, 32000, 32500, 33500, 34000, 35200, and 37500 (all are manufactured by the LUBRIZOL Corporation), Disperbyk-161, 162, 163, 164, 166, 180, 190, 191, and 192 (all are manufactured by BYK Japan KK), Flowlen DOPA-17, 22, 33, and G-700 (all are manufactured by Kyoeisha Chemical Co., Ltd.), Ajisper PB821 and PB711 (all are manufactured by Ajinomoto Fine-Techno Co., Inc.), and LP4010, LP4050, LP4055, POLYMER400, 401, 402, 403, 450, 451, and 453 (all are manufactured by EFKA Chemicals BV).

Examples of the preservative or the fungicide include sodium benzoate, Sodium pentachlorophenolate, 2-pyridinethiol-1-oxide sodium, sodium sorbate, sodium dehydroacetate, and 1,2-benzisothiazolin-3-one (Proxel CRL, Proxel BND, Proxel GXL, Proxel XL-2, and Proxel TN manufactured by ICI).

Examples of the pH adjusting agent, a dissolution aid, or antioxidant include amines such as diethanolamine, triethanolamine, propanolamine, and morpholino, and modified products thereof, inorganic salts such as potassium hydroxide, sodium hydroxide, and lithium hydroxide, ammonium hydroxide, quaternary ammonium hydroxide (tetramethylammonium, and the like), carbonates such as potassium carbonate, sodium carbonate, and lithium carbonate, and other phosphate or the like, or ureas such as N-methyl-2-pyrrolidone, urea, thiourea, tetramethylurea, allophanates such as allophanate and methyl allophanate, biurets such as biuret, dimethylbiuret, and tetramethylbiuret, and L-ascorbic acid and the salts thereof.

Preferably, the non-aqueous ink composition according to the embodiment does not contain a polymerizable compound. The polymerizable compound is a polymerizable compound contained in the ultraviolet curable ink composition. The viscosity of the non-aqueous ink composition according to the embodiment can be caused to be decreased compared with the ultraviolet curable ink composition containing the polymerizable compound so that the degasification efficiency is enhanced.

Physical Properties Of Non-Aqueous Ink Composition

The dissolved oxygen concentration in the non-aqueous ink composition according to the embodiment is in the range of 30% to 80% of the saturated dissolved oxygen concentration in room temperature. The higher limit of the dissolved oxygen concentration (oxygen saturation) becomes preferable as the higher limit becomes 70% or less, 60% or less, 55% or less, or 50% or less. In addition, the lower limit of the oxygen saturation becomes preferably as the lower limit becomes 35% or greater, or 40% or greater. The higher limit in the numerical value is preferable in view of the ejection stability, and the lower limit in the numerical value is preferable in view of the time shortening of the degassing step.

In addition, the viscosity of the non-aqueous ink composition according to the embodiment at 20° C. is preferable 5 mPa·s or less, considering the ejection capability of the recording head. Accordingly, the ejection stability of the non-aqueous ink becomes better. In addition, the viscosity is not limited, but the viscosity is 1 mPa·s or greater, since the degree of freedom in the design of the composition is increased. In addition, the viscosity can be measured by reading the viscosity at the time of Shear Rate 200 by using a viscoelasticity tester MCR-300 (manufactured by Anton Paar GmbH) under the environment of 20° C.

The surface tension of the non-aqueous ink composition according to the embodiment at 20° C. is preferably in the range of 20 mN/m to 50 mN/m, and more preferably in the range of 25 mN/m to 40 mN/m in view of the balance between the recording quality and the reliability as an ink jet ink. In addition, the surface tension can be measured by checking the surface tension when a platinum plate is wet with ink under the environment of 20° C. by using an automatic tensiometer CBVP-Z (Kyowa Interface Science Co., Ltd.).

Preparation Method of Non-Aqueous Ink Composition

The non-aqueous ink composition according to the embodiment can be manufactured by the common method in the related art. When the pigment is used as the coloring material, the pigment, the dispersant, and the organic solvent (a portion) are first mixed, and then the pigment dispersing liquid is prepared by a ball mill, a bead mill, ultrasonic waves, a jet mill, or the like, and adjusted so as to have desired ink characteristics. Subsequently, the organic solvent (remaining quantity), and the other additive (for example, surfactant or binder resin) are added under stirring to obtain the non-aqueous ink composition.

Degassing Method

The obtained non-aqueous ink composition is subjected to a degassing process and stored in an ink storage body. The method of causing the non-aqueous ink composition to have a dissolved oxygen concentration regulated in the invention is not particularly limited, and the degassing may be effectively performed by, for example, treating the ink composition under reduced pressure, particularly, by causing the ink composition to pass through a hollow fiber formed with a gas permeable film and reducing the pressure outside the hollow fiber.

The gas permeable film is a film having a characteristic of causing only the air dissolved in the liquid to pass. Examples of the materials of the gas permeable film include the polyethylene resin, the polypropylene resin, the poly(tetrafluoroethylene) resin, a polystyrene resin, and a polymethyl methacrylate resin, which are good in view of versatility and workability. Specifically, a hollow fiber membrane module manufactured by Nitto Denko Corporation (Nitosep, for example, SF-131LS) or a hollow fiber membrane module manufactured by Mitsubishi Rayon Co., Ltd. (for example, MHF304KM) can be used.

With respect to the degassing method, when the oxygen saturation of the ink is desired to be decreased, the vacuum degree by a decompression device has to be enhanced, or the ink composition has to be subjected to the degassing process for a long time. Therefore, there is a disadvantage in that the expansion of facilities for the degassing step in the ink preparation is required, and the time required for the degassing step becomes long.

As described in the embodiment below, in the non-aqueous ink composition according to the embodiment, bubbles are extinguished more quickly than in aqueous ink in the same temperature environment, and bubbles are extinguished even more quickly in a high temperature environment. Therefore, the dissolved oxygen concentration in the ink for maintaining the printing stability can be sufficiently obtained by the degassing step which is less than 80% of the saturated dissolved oxygen concentration under room temperature. Accordingly, since the degas degree in the same degree of the aqueous ink is not necessary, the facility for the degassing step in the preparation is not necessary and the time required for the degassing step is short, which leads to the cost reduction.

Ink Storage Body

An aspect of the invention is an ink storage body that stores the non-aqueous ink composition. In the specification, the "ink storage body" is a concept of including a container or a package which directly or indirectly stores the ink composition. The ink storage body is used to keep or transport the ink composition before the ink composition is used in a recording device, and to supply the ink composition stored in the ink storage body to the recording device when being used.

The form of the ink storage body is not particularly limited to the below, but the examples thereof may include an ink cartridge, a pack, a bottle, a tank, a bin, or a can. Among the examples, the ink cartridge, the pack, the bottle, and the tank are preferable, and the pack is more preferable, since they are generally used, and they can easily control the moisture permeability and the oxygen permeability to a desired degree.

FIG. 1 is an exploded diagram illustrating an example of an ink storage body according to the embodiment. An ink cartridge 3 includes an ink pack 70 that is filled with ink, and a cartridge case 72 that protects the ink pack 70 by storing the ink pack 70 inside and that is formed with a main body housing 76 and a cover portion 78. The ink pack 70 includes an ink supply port 74. The main body housing 76 includes a notch portion 80 and a groove portion 86, and the cover portion 78 includes a pressing portion 82 and a hook portion 84. In the ink cartridge 3, the ink pack 70 is stored in the main body housing 76 and the cover portion 78. At this point, the ink supply port 74 is engaged with the notch portion 80, and is fixed by being interposed between the pressing portion 82 and the notch portion 80. In addition, the main body housing 76 and the cover portion 78 are sealed if the hook portion 84 is fit into the groove portion 86. In addition, the ink pack 70 and the cartridge case 72 correspond to the "ink storage body" according to the invention. In addition, the configuration that directly stores the ink composition such as the ink pack 70 in the ink storage body is called a container. The ink storage body may be configured with the container only.

The usage form of the ink storage body is not particularly limited, but the examples thereof include a form (A) like the cartridge in which an ink storage body separate from the recording device is attached to the recording device and supplies the ink composition from the ink storage body to the recording device in an attached manner, a form (B) like a bottle that supplies the ink composition from the ink storage body which is separate from the recording device to the ink tank of the recording device, and a form (C) in which the ink storage body is included as a portion of the recording device in advance. In addition, in the case of the forms (A) and (C), the recording may be performed by supplying the ink composition from the attached ink storage body or the included ink storage body to the head of the recording device via the connection portion such as an ink tube. In addition, in the form (B), the recording may be performed by transferring the ink composition from the ink storage body to the ink tank of the recording device and then supplying the ink composition from the ink tank to the head of the recording device via the connection portion such as the ink tube.

Configuration Member

A material of the member that configures the container such as the ink pack 70 is not particularly limited, but the examples thereof include the resin such as polyethylene telephthalate (PET), polypropylene, polyethylene, an ethylene vinyl acetate copolymer, an ethylene vinylalcohol copolymer (EVOH), and polystyrene; or an inorganic substance such as glass. In addition, the configuration materials may be used by combining the materials at a proper ratio, and the plurality of kinds thereof may be used in an overlapped manner.

As the configuration member, a film is preferable in view of the flexibility or the weight reduction. The material of the member as the durable film material is not particularly limited, and the examples thereof include plastic films such as polyethylene telephthalate (PET), polyethylene, polypropylene, an ethylene vinyl acetate copolymer, an ethylene vinylalcohol copolymer, and polystyrene. Among these, polyethylene, polypropylene, an ethylene vinyl acetate copolymer, an ethylene vinylalcohol copolymer, and polystyrene which have high density, low density, or linear low density are preferable. The film material may be a laminated film or a stretched film.

The oxygen permeability of the configuration member of the container of the ink storage body is preferably 5.0 cc·20 μm/(m$^2$·day·atm) or less, more preferably 2.0 cc·20 μm/(m$^2$·day·atm) or less, and still more preferably 1.0 cc·20 μm/(m$^2$·day·atm) or less. In addition, the oxygen permeability of the configuration member of the container is 0 cc·20 μm/(m$^2$·day·atm) or greater. The oxygen permeability is not particularly limited, but is preferably 0.1 cc·20 µm/ (m²·day·atm) or greater in view of the degree of freedom in the design of the member. Since the oxygen permeability is the above range or less, the dissolved oxygen content of the kept ink composition is not likely to change. In addition, the oxygen permeability can be measured by the method regulated by ISO 14663-2:1999 (Annex C).

In order to enhance the oxygen permeability, the ink storage body may include a gas barrier layer. The gas barrier layer is not particularly limited, but the examples thereof include a metal layer such as an aluminum layer, an organic layer such as an ethylene vinylalcohol copolymer layer and a polyvinyl alcohol layer.

The total thickness of the member of the container is preferably 10 µm or greater, more preferably 20 µm or greater, still more preferably 30 µm or greater, further still more preferably 40 µm or greater, and even still more preferably 70 µm or greater. If the total thickness is 10 µm or greater, the moisture content of the stored ink composition and the dissolved oxygen content are not likely to be changed, and the strength of the ink storage body can be obtained. In addition, the total thickness is preferably 300 µm or less, more preferably 200 µm or less, and still more preferably 150 µm or less. If the total thickness is 200 µm or less, the visibility or the flexibility is more enhanced.

The capacity of the ink composition that can be stored in the ink storage body is preferably in the range of 100 mL to 3,000 mL, more preferably in the range of 100 mL to 2,000 mL, still more preferably in the range of 100 mL to 1,000 mL, particularly preferably in the range of 100 mL to 800 mL, and more particularly preferably in the range of 200 mL to 800 mL. If the capacity of the ink storage body is in the range above, there is an advantage in that after the usage of the ink storage body is started, while the dissolved oxygen content of the ink in the ink storage body is not rarely changed, the ink composition can be completely used or the dissolved oxygen content of the kept ink composition is hardly changed.

The moisture permeability of the ink storage body is preferably 20 g/m²·24 hours or less, more preferably 10 g/m²·24 hours or less, and still more preferably 5.0 g/m²·24 hours or less. If the moisture permeability is 20 g/m²·24 hours or less, the moisture amount in the stored ink composition is not likely to increase so that the pigment particle diameter is hardly changed and the long term preservation stability of the ink is particularly better. In addition, the moisture permeability of the ink storage body is not particularly limited, but in view of the degree of freedom in design, the moisture permeability is preferably 0.10 g/m²·24 hours or greater, more preferably 0.20g/m²·24 hours or greater, still more preferably 1.0 g/m²·24 hours or greater, and further more preferably 2.0 g/m²·24 hours or greater. In addition, the moisture permeability can be measured by gas chromatography.

Ink Jet Recording Method

The ink jet recording method according to the embodiment includes ejecting a droplet of the non-aqueous ink composition and attaching the droplet to a less absorbent recording medium to record an image.

The "less absorbent recording medium" in the specification may a recording medium of which the water absorption amount from the start of the contact to 30 msec$^{1/2}$ in the Bristow method is 10 mL/m² or less, and at least the recording surface has the characteristic. According to the definition, the "less absorbent recording medium" includes a non absorbent recording medium that does not absorb water at all. The Bristow method is a method most widely known as a method of measuring the liquid absorption amount for a short period of time, and is also employed by Japan Technical Association of the Pulp and Paper Industry (JAPAN TAPPI). The details of the testing method is described in Standard No. 51 "paper and paperboard-liquid absorbency testing method-Bristow method" of "JAPAN TAPPI Pulp and Paper Testing method 2000".

The less absorbent recording medium specifically includes a sheet, a film, a fiber product, and the like, which contain less absorbent materials. In addition, the less absorbent recording medium may include a layer that contains a less absorbent material (hereinafter, also referred to as "less absorbent layer") on the surface of the base material (for example, paper, fiber, leather, plastics, glass, ceramics, and metal). The less absorbent material is not particularly limited, but the examples thereof include the olefin-based resin, the ester-based resin, the urethane-based resin, the acryl-based resin, the vinyl chloride-based resin.

Among these, as the less absorbent recording medium, one having a recording surface containing the vinyl chloride-based resin can be preferably used. Specific examples of the vinyl chloride-based resin include polyvinyl chloride, the vinyl chloride-ethylene copolymer, the vinyl chloride-vinyl acetate copolymer, the vinyl chloride-vinyl ether copolymer, the vinyl chloride-vinylidene chloride copolymer, the vinyl chloride-maleic ester copolymer, the vinyl chloride-(meth)acrylate copolymer, the vinyl chloride-(meth) acrylic ester copolymer, and the vinyl chloride-urethane copolymer. In addition, various characteristics of the less absorbent recording medium such as a thickness, a form, a color, a softening temperature, and hardness are not particularly limited.

The non-aqueous ink composition contains cyclic esters. The cyclic esters has a function of dissolving the vinyl chloride-based resin as described above. Therefore, according to the ink jet recording method of the embodiment, an image having having excellent fixability and surface drying properties can be recorded by attaching the droplet of the non-aqueous ink composition on the recording surface containing the vinyl chloride-based resin.

The ink jet recording device using the ink jet recording method according to the embodiment is not particularly limited, but an drop on demand ink jet recording device is preferable. The drop on demand ink jet recording device may be a recording device employing the piezoelectric element recording method that performs the recording by using a piezoelectric element provided in the recording head, or a recording device employing a thermal ink jet recording that performs recording by using heat energy by a heater of a heat resistance element provided in the recording head, but any kinds of recording methods can be employed. In addition, the non-aqueous ink composition according to the embodiment has an advantage of being inert to the ejection nozzle surface subjected to the ink repelling treatment, so the non-aqueous ink composition can be advantageously used in, for example, the ink jet recording method of performing ejection from the ink jet recording head having the ejection nozzle surface subjected to the ink repelling treatment.

Ink Jet Recording Device

A form according to the invention is an ink jet recording device that performs the ink jet recording method.

As the ink jet recording device according to the embodiment, a well-known ink jet printer in the related art can be used. The examples of the ink jet printer include an ink jet printer as illustrated in FIG. 1 (hereinafter, also simply referred to as "printer").

Figure 2:
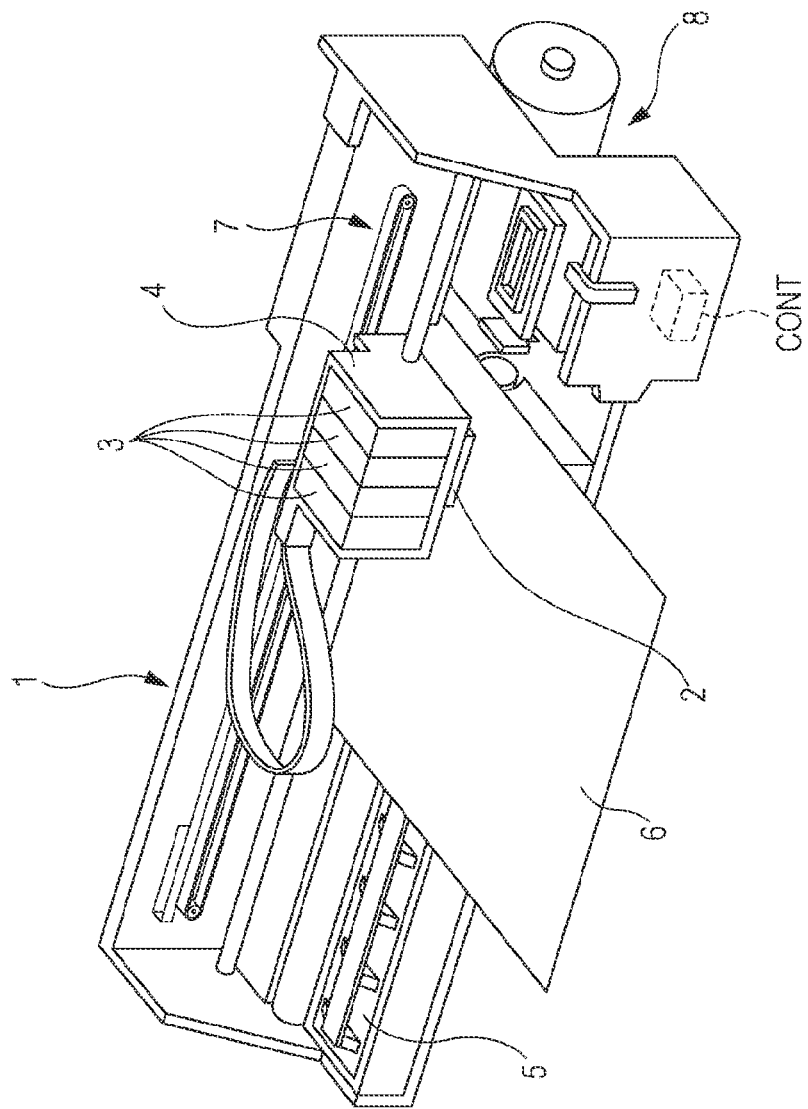
FIG. 2 is a perspective view schematically illustrating a configuration of a printer according to the embodiment.

FIG. 2 is a perspective view illustrating a configuration of a printer 1 according to the embodiment. As illustrated in FIG. 2, the printer 1 includes a carriage 4 that detachably installs the ink cartridge 3 together with mounting an ink jet recording head 2, the platen 5 that is installed on the lower side of an ink jet recording head (ink jet head) 2 and transports a recording medium 6, a carriage moving mechanism 7 that moves the carriage 4 in the medium width direction (main scanning direction S) of the recording medium 6, and a medium conveying mechanism 8 that transports the recording medium 6 in the medium conveying direction. In addition, the printer 1 has a control portion CONT that controls the entire operation of the corresponding printer 1.

The recording head 2 includes cavities that ejects the stored ink composition from the nozzles, ejection driving portions that are provided for respective cavities and apply ejection driving force to the ink, and nozzles that are provided for respective cavities and eject the ink composition to the outside of the head. The cavities, the ejection driving portions provided for the respective cavities, and the nozzles are respectively independent from each other, and one head may have plural cavities, ejection driving portions, and nozzles. The ejection driving portions can be formed by using electromechanical conversion elements such as piezoelectric elements that change the capacities of the cavities by mechanical deformation, electronic heat conversion elements that generate bubbles in ink by heating to eject the ink, or the like. The printer 1 may include one head or two or more heads for one color of ink.

The ink cartridge 3 is formed with independent plural cartridges, and the respective cartridges are filled with the non-aqueous ink compositions. In addition, the cartridges filled with the non-aqueous ink compositions may not be mounted on the carriage 4 at the time of the normal printing, but may be provided on the carriage 4 at least when the ink channels are cleaned.

The platen 5 includes a platen heater, and is configured to heat the recording medium to a set temperature. A heater is not built in the recording head 2. However, the temperature of the recording head is resultantly increased by the heating of the recording medium, so that the temperature of the ink stored in the recording head 2 also increases. Though not illustrated, the printer 1 may include an after heater in the recording medium transport path on the downstream side more than the platen heater.

The non-aqueous ink composition according to the embodiment is ejected from the recording head 2. Here, the temperature of the non-aqueous ink composition when being ejected from the recording head 2 is preferably 35° C. or greater, and more preferably 40° C. or greater. In addition, the temperature of the non-aqueous ink composition when being ejected from the ink jet head becomes more preferable as the temperature becomes 80° C. or less, 70° C. or less, 60° C. or less, or 50° C. or less. When the temperature is high, there is an advantage in that, even if the dissolved oxygen content is high, the ejection stability becomes better. The non-aqueous ink composition may be a case where the ink is heated in the head or in the course of supplying the ink to the head and is ejected in the above temperature or a case where the head receives the heat for heating the recording medium in the platen that faces the head so that the ink resultantly are ejected in the above temperature. The former case is preferable in that the viscosity is decreased so that the ink can be easily ejected, and the latter case is preferable in that the quality of the recorded product becomes better by heating the recording medium. The temperature is preferably 35° C. or greater in view of the easiness of the ejection or the quality of the recorded product.

In addition, according to the embodiment, the ejection frequency when the non-aqueous ink composition is ejected from the recording head 2 is preferably 1 kHz or greater or 200 kHz or less. If the ejection frequency is 200 kHz or less, the ejection frequency is preferable since the ejection stability becomes better, and if the ejection frequency is 1 kHz or greater, the ejection frequency is preferable since the recording speed is high. The ejection frequency means the ejection frequency in the unit of ejecting one ink droplet. The lower limit of the ejection frequency becomes preferable in view of the recording speed as the lower limit becomes 2 or greater, 3 or greater, 5 or greater, and 10 or greater, and the higher limit of the ejection frequency becomes preferable in view of the ejection stability as the higher limit becomes 200 or less, 150 or less, 100 or less, and 50 or less. In other words, since the ejection stability is much better while the recording speed is maintained, the higher limit is preferable as the higher limit becomes 20 or less, and 15 or less. Meanwhile, since the recording speed becomes higher while the ejection stability is maintained, the higher limit is preferable as the higher limit becomes 15 or greater, or 20 or greater. In addition, the ejection frequency can be the maximum ejection frequency in the recording method according to the embodiment. In this case, the ejection performed at the maximum ejection frequency can cause the ejection stability to be excellent when a solid image (dense image) which is preferable since the recording speed is not decreased. That is, the maximum ejection frequency is an ejection frequency when the ink droplet is ejected as much as possible to record an image.

As the printer 1 according to the embodiment, the on-carriage printer in which the ink cartridge 3 is mounted on the carriage 4 is provided as example, but the printer is not limited thereto. For example, the printer may be an off-carriage printer in which an ink storage body (for example, an ink pack or an ink cartridge) filled with the non-aqueous ink composition is mounted on the housing of the printer 1, and the non-aqueous ink composition is supplied to the head 2 via an ink supplying tube.

EXAMPLES

Preparation of Ink

Two kinds of non-aqueous ink (solvent ink) 1 and 2 as presented in Table 1 are prepared, aqueous ink (ink 3) using water as a main solvent as presented in Table 2 is prepared, and ultraviolet curable UV ink (ink 4) as presented in Table 3 is prepared.

TABLE 1

| Ink No. | 1 | 2 |
|---|---|---|
| Diethylene glycol diethyl ether (DEGDEE) | 66.0 | |
| tetraethylene glycol monobutyl ether (TeEGMBE) | 10.0 | |
| γ-butyrolactone (GBL) | 15.0 | |
| ethyl lactate | | 51.0 |
| 3-methoxy-3-methyl-1-butanol | | 25.0 |
| Naphtesol 160 | | 15.0 |
| BYK-331 | 1.0 | 1.0 |
| HM515 | 3.0 | 3.0 |
| P.Y.150 | 3.0 | 3.0 |
| Solsperse 32500 | 2.0 | 2.0 |
| Total | 100.0 | 100.0 |
| Viscosity mPa · s (20° C.) | A | A |

The relationship between the components of Table 1 and the embodiment of the specification is as follows.

Diethylene glycol diethyl ether (boiling point 189° C.), tetraethylene glycol monobutyl ether (boiling point 300° C.): alkylene glycol alkyl ethers
γ-butyrolactone (boiling point 204° C.): cyclic esters
Ethyl lactate (boiling point 155° C.): ester-based solvent
3-methoxy-3-methyl-1-butanol (boiling point 174° C.): alcohol-based solvent
Naphtesol 160 (distillation range 157° C. to 179° C.) hydrocarbon-based solvent
BYK-331 (manufactured by BYK Japan KK): surfactant
HM515 (acetate chloride resin, Kanevinyl manufactured by Kaneka Corporation): binder resin
P.Y.150: yellow pigment
Solsperse 32500 (manufactured by the LUBRIZOL Corporation): pigment dispersant

TABLE 2

| Ink No. | 3 |
|---|---|
| Glycerin | 10.0 |
| 1,2-hexanediol | 2.0 |
| Mowinyl 966A | 2.0 |
| P.Y.150 | 3.0 |
| Solsperse 27000 | 1.0 |
| BYK-333 | 0.5 |
| Ion exchanged water | remaining quantity |
| Total | 100.0 |
| Viscosity | A |

The components of the ink 3 (aqueous ink) in Table 2 are as follows.

Glycerin, 1,2-hexanediol: organic solvent
Mowinyl 966A (Nippon Synthetic Chem Industry Co., Ltd. acryl resin emulsion): resin emulsion
P.Y.150: yellow pigment
Solsperse 27000 (manufactured by the LUBRIZOL Corporation): pigment dispersant
BYK-333 (manufactured by BYK Japan KK): surfactant
Ion exchanged water: main solvent

TABLE 3

| Ink No. | 4 |
|---|---|
| Isobornyl acrylate | 40.0 |
| 1,6-hexanediol diacrylate | 30.0 |
| tetrahydrofurfuryl acrylate | 20.0 |
| Darocur TPO | 5.5 |
| BYK-UV3500 | 0.5 |
| P.Y.155 | 3.0 |
| Solsperse 32000 | 1.0 |
| Total | 100.0 |
| Viscosity | B |

The components of the ink 4 (UV ink) of Table 3 are described as follows.

Isobornyl acrylate, 1,6-hexanediol diacrylate, tetrahydrofurfuryl acrylate: polymerizable compound
Darocur TPO (manufactured by Ciba Specialty Chemicals): photopolymerization initiator
BYK-UV3500 (manufactured by BYK Japan KK): surfactant
P.Y.155: yellow pigment
Solsperse 32000 (manufactured by the LUBRIZOL Corporation): pigment dispersant The viscosities of ink 1 to 4 at 20° C. were respectively measured. The measurement of the viscosity was measured by measuring the viscosity in the Shear Rate 200 by using a viscoelasticity tester MCR-300 (manufactured by Anton Paar GmbH) under the environment of 20° C.

The measurement results of the viscosity were classified into A and B. The evaluation criteria of the A and B were as follows. The results are presented in Tables 1 to 3.

A: viscosity of 5 mPa·s or less

B: viscosity of greater than 5 mPa·s

Bubble Extinction Test

First, the relationships between the ink and the extinction times of the bubbles mixed into the ink were examined. In the bubble extinction test, only the ink 1 was used as the non-aqueous ink, and the ink 3 was used as the aqueous ink. In detail, with respect to the ink 1 and 3, the ink degassed by adjusting the degassing time so that the ratios of the dissolved oxygen concentrations (oxygen saturation) of the ink in which the dissolved oxygen concentrations were adjusted by degassing with respect to the saturated dissolved oxygen concentration in which the oxygen was sufficiently dissolved at 25° C. and the oxygen concentration was increased no more become the values in the examples was prepared. In Table 4, the kinds of ink and oxygen saturation in the respective examples are presented.

The oxygen saturation is presented as in the expression below. In addition, the oxygen concentration measurements were all performed at 25° C., and the saturated dissolved oxygen concentration means 100% in the expression below. The measurement of the dissolved oxygen concentration is performed by using a DO meter UC-12-SOL manufactured by Central Kagaku Corp. In addition, the measurement of the dissolved oxygen concentration with respect to the ink 3 is performed by using a DO meter UC-12 (for aqueous ink composition) manufactured by Central Kagaku Corp.

Oxygen saturation=(dissolved oxygen concentration of ink at 25° C./saturated dissolved oxygen concentration of ink at 25° C.)×100

The measurement unit of the dissolved oxygen analyzer is mg/L. The saturated dissolved oxygen concentrations of the ink at 25° C. measured by the dissolved oxygen analyzer were the values below.

Saturated dissolved oxygen concentration of ink

Ink 1, 2, and 4 (solvent ink, UV ink): 40 mg/L

Ink 3 (aqueous ink): 8 mg/L

A method of the bubble extinction test is described. First, transparent ink packs having gas barrier properties were filled with 700 mL of the ink and sealed so that air did not remain, and at the point, bubbles having approximately φ2 mm were introduced to the upper portions in the packs. The ink in the packs was observed in a state of being heated so as to be the temperatures presented in Table 4. The diameters of the bubbles were measured by photographing the external appearances and the scales of the bubbles at one minute interval by a microscope. In addition, since the volumes can be measured by measuring the diameters, the volumes will not be described here. In the packs, the films having low permeability (gas barrier properties) which had 100 μm of the thickness and were made with ethylene-vinylalcohol copolymer films were used. The oxygen permeability of the film was 1.0 cc·20 μm/(m²·day·atm).

TABLE 4

| Test No. | 1 (FIG. 3) | 2 (FIG. 4) | 3 (FIG. 5) | 4 (FIG. 7) | 5 | 6 | 7 (FIG. 6) | 8 |
|---|---|---|---|---|---|---|---|---|
| Ink | Ink 1 | Ink 1 | Ink 1 | Ink 3 | Ink 3 | Ink 3 | Ink 3 | Ink 3 |
| Oxygen saturation | Saturated | Saturated | 30% | Saturated | Saturated | Saturated | 10% | 10% |
| Ink Temperature | 25° C. | 60° C. | 25° C. | 60° C. | 40° C. | 25° C. | 25° C. | 60° C. |
| Bubble extinction time | 2.3 days | 0.07 days | 0.063 days | X | X | X | 0.45 days | X |

Figure 3:
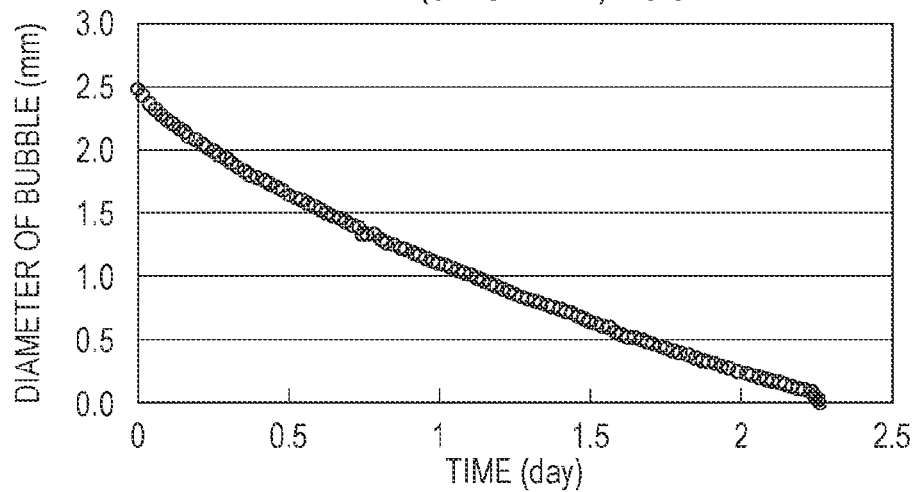
FIG. 3 is a diagram illustrating results of Bubble Extinction Test 1 in Table 4.
Figure 4:
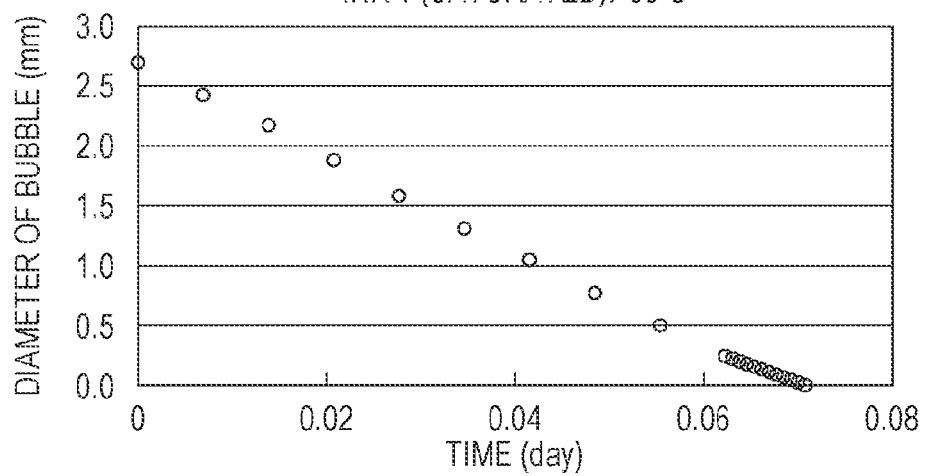
FIG. 4 is a diagram illustrating results of Bubble Extinction Test 2 in Table 4.
Figure 5:
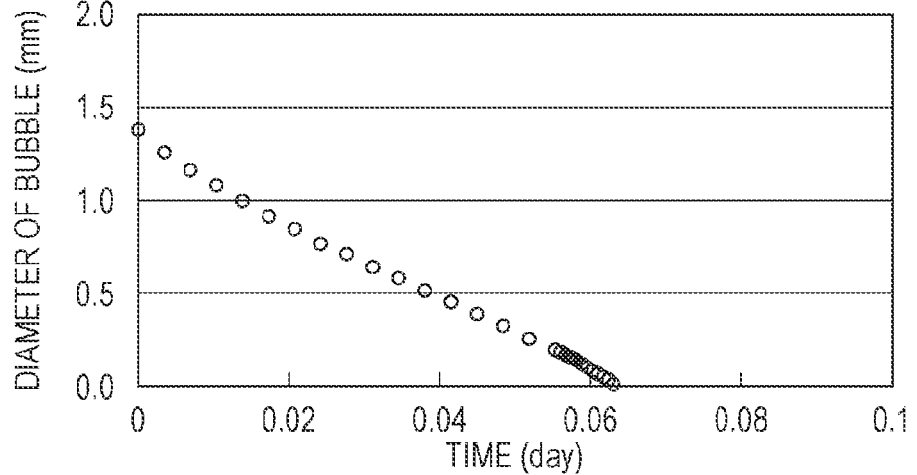
FIG. 5 is a diagram illustrating results of Bubble Extinction Test 3 in Table 4.
Figure 6:
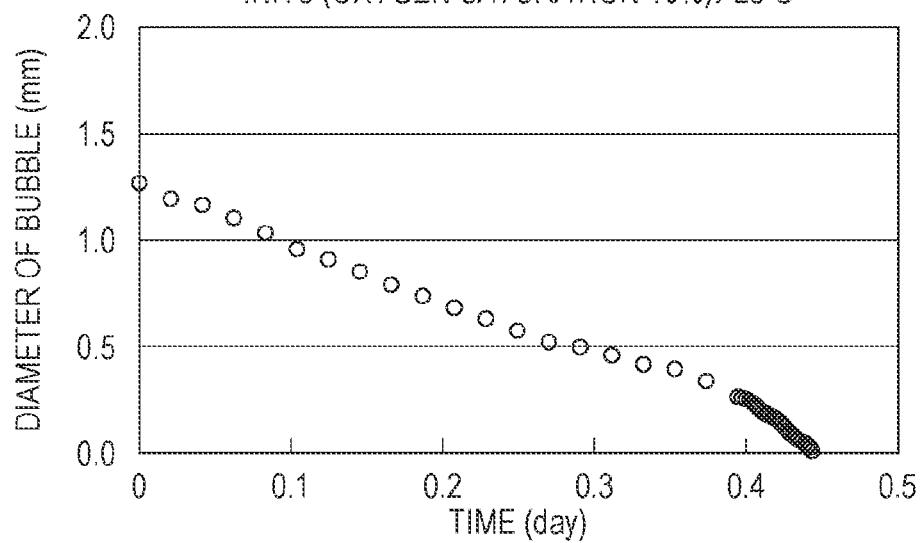
FIG. 6 is a diagram illustrating results of Bubble Extinction Test 7 in Table 4.
Figure 7:
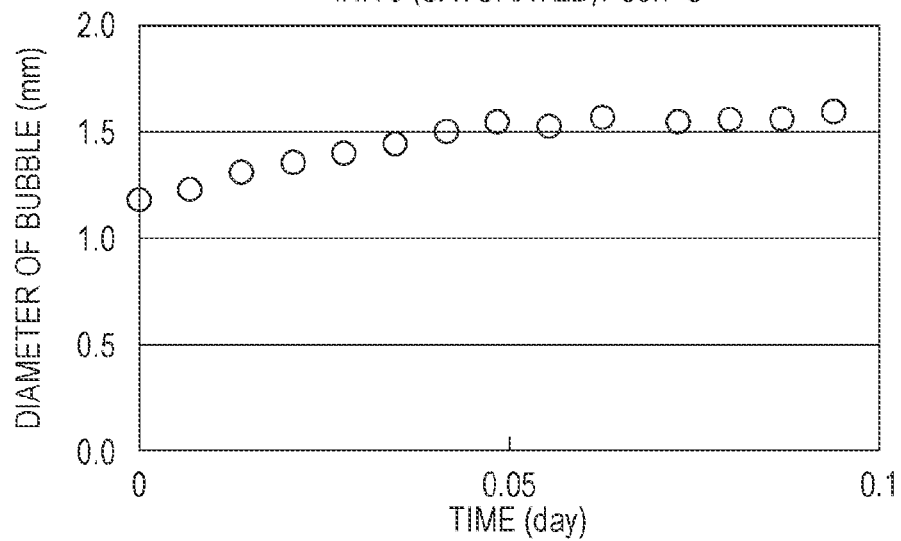
FIG. 7 is a diagram illustrating results of Bubble Extinction Test 4 in Table 4.

FIG. 3 is a diagram illustrating the result of Bubble Extinction Test 1 in Table 4, FIG. 4 is a diagram illustrating the result of Test 2, FIG. 5 is a diagram illustrating the result of Test 3, FIG. 6 is a diagram illustrating the result of Test 7, and FIG. 7 is a diagram illustrating the result of Test 4. In FIGS. 3 to 7, the vertical axes indicate the observed diameters of the bubbles, and the horizontal axes indicate days.

As illustrated in FIG. 3, it took 2 days for the extinction of the bubbles the ink 1 (saturated dissolved oxygen concentration) at 25° C. That is, in the ink of the saturated dissolved oxygen concentration at 25° C., if the bubbles mixed into the ink channel were not trapped, the bubbles went into the head as they were, so that ejection defects occurred.

As illustrated in FIG. 4, it took about 0.07 days for the extinction of the bubbles in the ink 1 (saturated dissolved oxygen concentration) at 60° C. It was found that if the temperature was hot, the extinction of the bubbles became faster than FIG. 3. This is distinctively different from the case where the bubbles in the aqueous ink (saturated dissolved oxygen concentration) are enlarged in the environment of 60° C. Therefore, it was found that in the case of the non-aqueous ink, it was effective to raise the temperature in order to extinguish the bubbles. Here, as an example, the evaluation was performed at the temperature described above, and the temperature itself does not have special meaning.

As illustrated in FIG. 5, it took about 0.06 days for the extinction of the bubbles in the ink 1 (oxygen saturation of 30%) at 25° C.

As illustrated in FIG. 6, it took about 0.45 days for the extinction of the bubbles in the ink 3 (oxygen saturation of 10%) at 25° C. In this manner, it was found that the extinction of the bubbles in the ink 3 is slower than that in the ink 1 of FIG. 5 even if the oxygen saturation was low.

As illustrated in FIG. 7, the temperature of the aqueous ink (the ink 3) having the saturated dissolved oxygen concentration was set to be 60° C., but the bubbles were not extinguished but were rather increased. Further, as indicated in the aqueous ink as in Tests 5 and 6 in Table 2, if the oxygen saturation was saturated, the bubbles were increased and were not extinguished at all temperatures. That is, in the case of the aqueous ink, it was found that when the oxygen saturation was saturated, even if the temperature was low, the bubbles were not extinguished. In addition, as indicated in Test 8 of Table 2, since the bubbles were not extinguished even if the oxygen saturation was 10% at 60° C., it was found that in the case of the aqueous ink, if the temperature was high, even if the oxygen concentration was low, the bubbles were not extinguished. Therefore, it was found that, in the case of the aqueous ink, in order to extinguish the bubbles, the oxygen saturation had to be decreased and the temperature had to be decreased.

According to the bubble extinction test, it was found that in the non-aqueous ink according to the embodiment, the extinction of the bubbles was faster than in the aqueous ink in the same temperature environment, and the extinction of the bubbles was more faster in the high temperature environment. It is considered that this was because in the case of the non-aqueous ink so that the saturated dissolved oxygen concentration was high, and the oxygen amount of the difference between the dissolved oxygen concentration and the saturated dissolved oxygen concentration was able to be dissolved in the non-aqueous ink. That is, since the dissolved oxygen concentration (oxygen saturation) of the non-aqueous ink does not have to be as low as that of the aqueous ink, the time required for the degassing step by using the degas module can be reduced so that the cost reduction can be obtained.

Recording Evaluation

Subsequently, the recording evaluation was performed on the ink. Specifically, the ink was prepared in the same manner as in the bubble extinction test, and was stored in the packs, and the packs were mounted on an ink jet printer (Seiko Epson SC-530650) so that one nozzle array of the head was filed with the ink. In Examples 1 to 3, 6, and 8, and Comparative Examples 1 to 4, and 8, recording media were heated by using platen heaters and after heaters provided on media transport paths on the downstream more than the platen heaters. In the other examples, the platen heaters were not used, but the after heaters were used so that the media were heated by the after heaters in the same manner.

The recording media (polyvinyl chloride sheets, SV-G-1270G manufactured by Roland DG Corporation) were set in the printer, to record solid patterns having 720 ×720 dpi of the recording resolutions. The recording was continuously performed for 20 minutes. The temperatures of the nozzle plates when the recording was ended were measured, and set as the ejection temperatures on respective columns of Table 5. In the examples using the platen heaters of Table 5, the recording was performed in a state in which the platen heaters were adjusted so as to be the temperatures in Table 5. The ink in the nozzles was in the temperatures of the nozzle plates. Though the ink was not heated in the head or in the ink channels, the nozzles received heat from the recording media so that the ink temperatures become about 35° C. The driving control was performed so that the ejection frequencies of the ink droplets became the frequencies in the respective examples. The carriage speeds were adjusted in accordance with the ejection frequencies. The portions to be used in the recorded product evaluations of the recording media discharged from the printer were placed for one day in room temperature after being discharged. With respect to the ink 4, the recording surface was irradiated with irradiation energy of 500 mJ/cm$^2$ by an LED having 395 nm of a peak wavelength.

TABLE 5

| | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|
| Ink | Ink 1 | Ink 1 | Ink 1 | Ink 1 | Ink 1 | Ink 1 | Ink 2 | Ink 2 | Ink 1 | Ink 1 |
| Oxygen saturation | 50% | 30% | 80% | 50% | 30% | 50% | 30% | 30% | Saturated | 10% |
| Ejection temperature | 35° C. | 35° C. | 35° C. | 25° C. | 25° C. | 35° C. | 25° C. | 35° C. | 35° C. | 35° C. |
| Driving frequency | 20 kHz | 20 kHz | 20 kHz | 20 kHz | 20 kHz | 14 kHz | 20 kHz | 20 kHz | 20 kHz | 20 kHz |
| Ejection stability | B | A | C | C | B | A | C | B | D | A |
| Ink degasification efficiency | A | B | A | A | B | A | B | B | A | D |
| Friction solidity | A | A | A | A | A | A | B | B | A | A |
| Glossiness | B | B | B | B | B | B | C | C | B | B |

| | Comparative Example 3 | Comparative Example 4 | Comparative Example 5 | Comparative Example 6 | Comparative Example 7 | Comparative Example 8 |
|---|---|---|---|---|---|---|
| Ink | Ink 3 | Ink 3 | Ink 3 | Ink 3 | Ink 3 | Ink 4 |
| Oxygen saturation | 30% | 10% | 10% | Saturated | 30% | 50% |
| Ejection temperature | 35° C. | 35° C. | 25° C. | 25° C. | 25° C. | 35° C. |
| Driving frequency | 20 kHz | 20 kHz | 20 kHz | 20 kHz | 20 kHz | 20 kHz |
| Ejection stability | D | D | B | D | D | C |
| Ink degasification efficiency | B | B | B | A | B | D |
| Friction solidity | D | D | D | D | D | B |
| Glossiness | D | D | D | D | D | B |

Ejection Stability

When continuous printing was ended, ejection tests were performed. The number of non-ejection nozzles among all (360) nozzles were checked. In addition, the examination was performed on the nozzles determined as the non-ejection nozzles, to find out that bubbles were mixed into the pressure chambers corresponding to the nozzles.

The evaluation criteria were as follows. The results were presented in Table 5.
A: no non-ejection nozzles
B: 2 non-ejection nozzles or less
C: 3 to 5 non-ejection nozzles
D: 6 non-ejection nozzles or more Ink Degasification Efficiency After the ink was adjusted, the ink was supplied to the ink packs via the ink supplying tube having 5 mm of a diameter from a ink preparation furnace used in the ink preparation. In the middle of the ink supplying tube, the degas module using a hollow fiber membrane was provided, and the pressure of the degas module was reduced to 5.3 kPa, and the degassing was performed while the ink was supplied. The ink supplying speed was adjusted so that the oxygen saturation of the ink supplied to the packs became the values in the examples. If the supplying speed was late, a long period of time is required for supplying the ink to the packs.

The evaluation criteria were as follows. The results were presented in Table 5.
A: faster than 150 mL/min of ink supplying speed
B: ink supplying speed in the range of faster than 100 mL/min to 150 mL/min or less
D: 100 mL/min of ink supplying speed or less Friction Solidity Dry tests were performed on patterns surfaces of recorded products for evaluations by an I-type tester based on JIS L 0849. Thereafter, OD values of the color migration in the test cotton cloth were measured by Spectrolino (manufactured by Gretagmacbeth) and evaluated.

The evaluation criteria were as follows. The results were presented in Table 5.
A: 0.2 or less
B: greater than 0.2 to 0.3 or less
D: greater than 0.3

Glossiness

20° gloss of pattern surfaces of the evaluation recorded products was measured by MULTI GLOSS 268 (manufactured by Konica Minolta, Inc.).

The evaluation criteria were as follows. The results were presented in Table 5.
B: 30 or higher of glossiness
C: lower than 30 and 25 or higher of glossiness
D: lower than 25 of glossiness When the gloss is high, a glossy recording medium such as a film is preferable since the recording medium becomes a natural recorded product in which a gloss level of a pattern portion of a recorded product and that of the film material are close with each other.

From the results in Table 5, it was found that the ink jet ink in which the printing stability was secured can be provided by degassing the non-aqueous ink so that the oxygen saturation in the degassing step in the preparation of the ink became less than 50% when the non-aqueous ink was used in a state in which no heating was performed, and degassing the non-aqueous ink so that the oxygen saturation in the degassing step in the preparation of the ink became less than 80% when the non-aqueous ink was used in a state in which the heating was performed.

The evaluation results presented in Table 5 were further considered as follows.

In Example 4, since the head was in room temperature when recording, the ejection stability was slightly low.

In Example 6, the ejection stability was better than that in Example 1, it is assumed that it was because the driving frequency of the head was low. Accordingly, it was found that the invention was particularly useful when high speed recording was be able to be performed by causing the ejection stability to be high.

From the results presented in Example 7, it was found that the ejection stability was decreased when the temperature was low.

In Example 8, it was found that the ink 2 having the non-glycol ether solvent was worse than that in Example 2 since the glossiness was low. In addition, it was found that the ink 2 was dried to be thickened in the nozzles in the dry and hot environment so that the ejection stability was decreased.

The entire disclosures of Japanese Patent Application Nos. 2014-066934 filed on Mar. 27, 2014 and 2015-056168 filed on Mar. 19, 2015 are expressly incorporated by reference herein.

What is claimed is:

1. A non-aqueous ink jet ink composition stored in an ink storage body,
    wherein a solvent contained in an ink composition is configured with an organic solvent,
    wherein an amount of water contained in the ink composition is 5% by mass or less, and
    wherein a dissolved oxygen concentration in the ink composition is in a range of 30% to 80% of a saturated dissolved oxygen concentration in room temperature.

2. The non-aqueous ink jet ink composition according to claim 1,
    wherein the dissolved oxygen concentration of the non-aqueous ink jet ink composition is in a range of 40% to 55% of the saturated dissolved oxygen concentration in room temperature.

3. The non-aqueous ink jet ink composition according to claim 1, containing:
    alkylene glycol alkyl ethers or cyclic esters as the organic solvent.

4. The non-aqueous ink jet ink composition according to claim 3, containing:
    alkylene glycol alkyl ethers as a main solvent of the organic solvent.

5. The non-aqueous ink jet ink composition according to claim 1,
    wherein the non-aqueous ink jet ink composition does not contain a polymerizable compound.

6. The non-aqueous ink jet ink composition according to claim 1,
    wherein a viscosity of the non-aqueous ink jet ink composition is 5 mPa·s or less at 20° C.

7. The non-aqueous ink jet ink composition according to claim 1,
    wherein a temperature of the non-aqueous ink jet ink composition when being ejected from an ink jet head is 35° C. or greater.

8. The non-aqueous ink jet ink composition according to claim 1,
    wherein an ejection frequency when the non-aqueous ink jet ink composition was ejected from an ink jet head is in a range of 1 kHz to 200 kHz.

9. An ink storage body that stores the non-aqueous ink jet ink composition according to claim 1.

10. An ink storage body that stores the non-aqueous ink jet ink composition according to claim 2.

11. An ink storage body that stores the non-aqueous ink jet ink composition according to claim 3.

12. An ink storage body that stores the non-aqueous ink jet ink composition according to claim 4.

13. An ink storage body that stores the non-aqueous ink jet ink composition according to claim 5.

14. An ink storage body that stores the non-aqueous ink jet ink composition according to claim 6.

15. An ink storage body that stores the non-aqueous ink jet ink composition according to claim 7.

16. An ink storage body that stores the non-aqueous ink jet ink composition according to claim 8.

17. An ink jet recording method for performing recording by using the non-aqueous ink jet ink composition according to claim 1.

18. An ink jet recording method for performing recording by using the non-aqueous ink jet ink composition according to claim 2.

19. An ink jet recording method for performing recording by using the non-aqueous ink jet ink composition according to claim 3.

20. An ink jet recording device that performs the ink jet recording method according to claim 17.

* * * * *